(12) United States Patent  
Asuka et al.

(10) Patent No.: US 9,011,592 B2  
(45) Date of Patent: Apr. 21, 2015

(54) TRANSPARENT INORGANIC-ORGANIC HYBRID MATERIALS VIA AQUEOUS SOL-GEL PROCESSING

(71) Applicant: University of Florida Research Foundation, Inc., Gainesville, FL (US)

(72) Inventors: Masahiro Asuka, Osaka (JP); Wolfgang M. Sigmund, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 14/243,390

(22) Filed: Apr. 2, 2014

(65) Prior Publication Data

US 2014/0208982 A1     Jul. 31, 2014

Related U.S. Application Data

(62) Division of application No. 13/126,206, filed as application No. PCT/US2009/056618 on Sep. 11, 2009, now Pat. No. 8,728,579.

(60) Provisional application No. 61/110,435, filed on Oct. 31, 2008.

(51) Int. Cl.
| | |
|---|---|
| C09D 183/02 | (2006.01) |
| C08L 83/00 | (2006.01) |
| B82Y 20/00 | (2011.01) |
| B82Y 30/00 | (2011.01) |
| C08G 77/14 | (2006.01) |

(Continued)

(52) U.S. Cl.
CPC ............. C09D 183/02 (2013.01); C08L 83/00 (2013.01); B82Y 20/00 (2013.01); B82Y 30/00 (2013.01); C08G 77/14 (2013.01); C08G 77/58 (2013.01); C08K 3/32 (2013.01); C08K 3/36 (2013.01);

(Continued)

(58) Field of Classification Search
None
See application file for complete search history.

(56) References Cited

U.S. PATENT DOCUMENTS

| | | |
|---|---|---|
| 5,196,382 A | 3/1993 | Hench et al. |
| 6,855,396 B1 | 2/2005 | Mennig et al. |

(Continued)

FOREIGN PATENT DOCUMENTS

| | | |
|---|---|---|
| EP | 1785457 | 5/2007 |
| EP | 1860166 | 11/2007 |

(Continued)

OTHER PUBLICATIONS

Noll, W., Chemistry and Technology of Silicones, 1968, pp. 197-198, 2nd Edition, Academic Press, New York, NY.

(Continued)

*Primary Examiner* — Erma Cameron (74) *Attorney, Agent, or Firm* — Saliwanchik, Lloyd & Eisenschenk (57) ABSTRACT

A sol to form an inorganic-organic hybrid coating having a thick highly transparent hard coating is described. The hybrid coating is formed from a combined aqueous sol with least one hydrolyzable silane and at least one hydrolyzable metal oxide precursor where the only organic solvents present are those liberated upon hydrolysis of the silanes and metal oxide precursors. In one embodiment an inorganic-organic hybrid coating is formed by combination of a sol, prepared by the hydrolysis of tetraethoxysilane and γ-glycidoxypropyltrimethoxysilane with an excess of water, and a sol, prepared by the hydrolysis of titanium tetrabutoxide and γ-glycidoxypropyltrimethoxysilane with a deficiency of water. A plastic substrate can be coated with the combined sol and the combined sol gelled to a thickness of at least 5 μm with heating to less than 150° C.

11 Claims, 5 Drawing Sheets

(51) Int. Cl.

| | | |
|---|---|---|
| *C08G 77/58* | (2006.01) | |
| *C09D 183/04* | (2006.01) | |
| *C09D 183/06* | (2006.01) | |
| *C09D 183/14* | (2006.01) | |
| *G02B 1/10* | (2006.01) | |
| *C08K 3/32* | (2006.01) | |
| *C08K 3/36* | (2006.01) | |

(52) U.S. Cl.
CPC ............ *C09D 183/04* (2013.01); *C09D 183/06* (2013.01); *C09D 183/14* (2013.01); *G02B 1/105* (2013.01)

(56) References Cited

U.S. PATENT DOCUMENTS

2003/0167878 A1  9/2003  Al-Salim et al.
2004/0002617 A1*  1/2004  Rantala et al. ................. 562/405
2005/0244658 A1  11/2005  Bae et al.
2007/0134503 A1  6/2007  Espinosa
2007/0269653 A1  11/2007  Kanamori et al.
2011/0003142 A1*  1/2011  Asuka et al. ................... 428/329

FOREIGN PATENT DOCUMENTS

EP   2009073      12/2008
WO   WO 01-31401   5/2001

OTHER PUBLICATIONS

Definition of "oxalic acid" from Hawley's Condensed Chemical Dictionary, Twelfth Edition, p. 860, 1993.

Definition of "solvent" from Hawley's Condensed Chemical Dictionary, Twelfth Edition, p. 1076, 1993.

* cited by examiner

Figure 5

TRANSPARENT INORGANIC-ORGANIC HYBRID MATERIALS VIA AQUEOUS SOL-GEL PROCESSING

CROSS-REFERENCE TO RELATED APPLICATIONS

This application is a divisional of U.S. application Ser. No. 13/126,206, filed Apr. 27, 2011, which is the U.S. national stage application of International Patent Application No. PCT/US2009/056618, filed Sep. 11, 2009, which claims the benefit of U.S. Provisional Application Ser. No. 61/110,435, filed Oct. 31, 2008, the disclosures of which are hereby incorporated by reference in their entireties, including any figures, tables, or drawings.

BACKGROUND OF THE INVENTION

Transparent coatings from sol-gel techniques that closely approximate inorganic glasses are commonly formed from alcohols or other non-aqueous solvents. For example, to obtain a continuous transparent coating, a $TiO_2$ glass is often formed from condensation of a tetraalkoxytitanate in the presence of a chelating agent in an alcohol solvent or under restricted conditions, such as synthesis in a glove box. Aqueous solvents, or even using a large quantity of water during the process, generally promote the condensation of precursors into particulate glasses. Even when non-aqueous solvents are used, the formation of a hard robust coating is problematic as the resulting glasses often have a tendency to crack because of shrinkage induced stresses upon evaporation of solvents and the loss of condensation byproducts. Because of this propensity for cracking, coating thicknesses in excess of 1.5 µm generally require that multiple thin coating layers are made, usually with practical limits of 20 to 30 coats. The formation of thick single layer coatings is often achieved in a non-aqueous system by the use of an inorganic/organic composite, an organically modified ceramic, where an organic component is included in a colloidal sol-gel system. Generally there is little interpenetration of these inorganic and organic portions, and high hardness with optical transparency is generally not achieved in such systems.

As the use of organic polymer based devices, such as LCD displays and LED lighting, increases, there is a greater need for thick superior abrasive resistant transparent coatings that have excellent barrier properties for plastic or other organic substrates, and where the processing can be carried out with the formation of a single coating layer in a manner that does not damage the underlying substrate. Hence the formation of a transparent hard coating with high solids that act as an excellent diffusion barrier for an underlying substrate remains a need.

BRIEF SUMMARY OF THE INVENTION

Embodiments of the invention are directed to an inorganic-organic hybrid coating where a sol-gel glass is derived from a sol having at least one hydrolyzable silane, where at least one silane contains at least one polymerizable organic group attached to the silane, and at least one hydrolyzable metal oxide precursor. The sol is free of organic solvents in excess of that which can be formed upon hydrolysis of the silane and metal oxide precursor. The silanes are of the structure $R_{(4-n)}SiX_n$ where: n is 1 to 4; X is independently a hydrolyzable group selected from $C_1$ to $C_6$ alkoxy, Cl, Br, I, hydrogen, $C_1$ to $C_6$ acyloxy, and NR'R" where R' and R" are independently H or $C_1$ to $C_6$ alkyl, $C(O)R'''$, where R''' is independently H, or $C_1$ to $C_6$ alkyl; and R is independently $C_1$ to $C_{12}$ radicals, optionally with one or more heteroatoms, including O, S, NH, and NR"" where R"" is $C_1$ to $C_6$ alkyl or aryl. The radical cannot be hydrolyzed from the silane and contains a group capable of undergoing polyaddition or polycondensation reactions, selected from Cl, Br, I, unsubstituted or monosubstituted amino, amido, carboxyl, mercapto, isocyanato, hydroxyl, alkoxy, alkoxycarbonyl, acyloxy, phosphorous acid, acryloxy, metacryloxy, epoxy, vinyl, alkenyl, or alkynyl. In one embodiment the silanes are tetraethoxysilane (TEOS) and γ-glycidoxypropyltrimethoxysilane (GPTMS). The metal oxide precursor can be $MX_n$ where: n is 2 to 4; M is a metal selected from the group consisting of Ti, Zr, Al, B, Sn, and V; and X is a hydrolyzable moiety selected from the group $C_1$ to $C_6$ alkoxy, Cl, Br, I, hydrogen, and $C_1$ to $C_6$ acryloxy. In one embodiment, the metal oxide precursor comprises titanium tetrabutoxide (TTB).

The sol and subsequent coating can contain dispersed nanoparticles that are oxides, oxide hydrates, nitrides, or carbides of Si, Al, B, Ti, or Zr in the shape of spheres, needles, or platelets. For example, the nanoparticles can be $SiO_2$, $TiO_2$, $ZrO_2$, $Al_2O_3$, $Al(O)OH$, $Si_3N_4$ or mixtures thereof. Typical nanoparticles can be 2 to 50 nm in cross section. In one embodiment, the nanoparticles can be boehmite rods, platelets, or a combination thereof.

Other embodiments of the invention are directed to a method for coating a substrate with an inorganic-organic hybrid material of a combined sol with the compositions described above, where at least one silicate sol, having at least one hydrolyzable silane, where at least one of the silanes has at least one polymerizable organic group attached to the silane and a stoichiometric excess of water, is added to a metal oxide sol, having at least one metal oxide and at least one hydrolyzable silane having at least one polymerizable organic group attached to the silane with less than a stoichiometric amount of water relative to the silanes and metal oxide precursors, to form the combined sol. This combined sol is coated on a substrate and gelled to form a coating that is transparent to visible light. The coating with a thickness of at least 2 µm has a transmittance of at least 95%. In embodiments of the invention, nanoparticles can be dispersed in the combined sol. Coating can be carried out by any technique including dipping, spreading, brushing, knife coating, rolling, spraying, spin coating, screen printing, and curtain coating. Gelling can be carried out at ambient conditions or by heating as constrained by the substrate upon which the coating is formed. For example the substrate can be an organic material such as a thermoplastic and gelation can be carried out below the glass transition temperature of the thermoplastic.

DETAILED DESCRIPTION OF THE INVENTION

Embodiments of the invention are directed to water based sol-gel processing that are free of included organic solvents, although organic compounds that are often used as solvents can be released upon hydrolysis of the sol precursors in the aqueous solvent. Inorganic-organic hybrid materials are formed where organic group containing precursors are hydrolyzed and condensed with inorganic precursors in the aqueous environment. The inorganic precursors can be those that form mixed metal oxides of silicon, titanium, aluminum, or zirconium. Unlike common methods where white precipitates are formed between these metal oxide precursors in aqueous rich systems, methods according to embodiments of the invention do not form such precipitates and permit the formation of thick clear crack free glasses on a single deposition from an aqueous solution. The resulting glasses display transparencies of at least 95% in the visible range and display good mechanical properties. In some embodiments of the invention, various metal oxide particles can be dispersed in the glass precursors and cured into the final glass.

The organic group containing precursor and the inorganic precursor can be hydrolyzable silanes. The hydrolyzable silane can be any compound or a mixture of compounds with the formula $R_{(4-n)}SiX_n$ where: n is 1 to 4 and where X is independently a hydrolyzable group including $C_1$ to $C_6$ alkoxy, Cl, Br, I, hydrogen, $C_1$ to $C_6$ acyloxy, NR'R" where R' and R" are independently H or $C_1$ to $C_6$ alkyl, C(O)R''', where R''' is independently H, or $C_1$ to $C_6$ alkyl. Particularly useful X groups for embodiments of the invention are $C_1$ to $C_4$ alkoxy groups, as volatile alcohols are formed upon hydrolysis. When n is 4, the silane is an inorganic precursor. When n is less than 4, the silane constitutes the organic group containing precursor. For the organic group containing precursor, R is independently $C_1$ to $C_{12}$ radicals, optionally with one or more heteroatoms, including O, S, NH, and NR'''' where R'''' is $C_1$ to $C_6$ alkyl or aryl, wherein the radical is non-hydrolyzable from the silane and contains a group capable of undergoing a polyaddition or polycondensation reaction, including Cl, Br, I, unsubstituted or monosubstituted amino, amido, carboxyl, mercapto, isocyanato, hydroxyl, alkoxy, alkoxycarbonyl, acyloxy, phosphorous acid, acryloxy, metacryloxy, epoxy, vinyl, alkenyl, or alkynyl. A particularly useful R group is γ-glycidoxypropy, where for example, the compound of formula $R_{(4-n)}SiX_n$ is γ-glycidoxypropyltrimethoxysilane (GPTMS) or γ-glycidoxypropyltriethoxysilane.

The inorganic precursor can include an additional hydrolyzable metal oxide precursor as well as a silicon oxide precursor where the additional metal oxide precursor is one or more compounds of the formula $MX_n$ where: n is 2 to 4; M is a metal selected from the group consisting of Ti, Zr, Al, B, Sn, and V; and X is a hydrolyzable moiety selected from the group $C_1$ to $C_6$ alkoxy, Cl, Br, I, hydrogen, and $C_1$ to $C_6$ acryloxy. Ti, Al, and Zr are preferred metals. Again, particularly useful X groups for embodiments of the invention are $C_1$ to $C_4$ alkoxy groups, as volatile alcohols are formed upon hydrolysis.

The organic group containing precursor can be employed at a level of about 20 to about 99 mole percent of the combined precursors to the ultimate unfilled gelled coating. A silicon dioxide inorganic precursor can be employed up to about 70 mole percent of the combined precursors in the ultimate unfilled gelled coating. The other metal oxide inorganic precursor can be employed in up to about 40 mole percent of the combined precursors. Additionally, in some embodiments of the invention, metal oxide nanoparticles can be suspended as composite fillers in the combined aqueous sol. The nanoparticles are selected from the oxides, oxide hydrates, nitrides, and carbides of Si, Al, B, Ti, and Zr. The nanoparticle can be from 1 to 100 nm in diameter, preferably from 2 to 50 nm in diameter and more preferably from 5 to 20 nm in diameter. The nanoparticles can be included in one or more of the sols as a powder, or as a suspension in an aqueous solvent. Among the nanoparticles for use in the invention are $SiO_2$, $TiO_2$, $ZrO_2$, $Al_2O_3$, $Al(O)OH$, and $Si_3N_4$. The nanoparticles can be in the shape of spheres, needles, platelets, or any other shape. Advantageously, the nanoparticles are readily dispersed in water with relatively little aggregation into larger particles. Particular useful particles include the boehmite form of aluminum oxide. For example, rod shaped particles of boehmite can be dispersed at 10 wt % in water, leaving an average particle size of about 10 nm without the formation of larger aggregate particles, as is common in non-aqueous solvents. Nanoparticles with larger aspect ratios, such as platelets, can form free flowing aqueous suspensions in water, which can be combined with the aqueous sol in embodiments of the invention.

A catalyst for hydrolysis and subsequent condensation of the precursors can be included in the coating formulation as needed. The catalyst can be an acid or a base, but is generally and acid. For example the acid can be nitric acid. Additional catalyst for the polyaddition or polycondensation reaction of some or all of the R groups of the silanes can be included in the coating formulation. The catalyst can be a photoinitiator. Optional components that can be included, separately or in combination, in the sol formulations, to achieve the desired properties and curing profiles of the ultimate gelled coatings, are colorants, leveling agents, UV stabilizers, and photosensitizers.

In embodiments of the invention employing inorganic precursors of two different metals, inorganic precursors of one metal and organic group containing precursors are hydrolyzed and condensed to form one sol and inorganic precursors of another metal and organic group containing precursors are hydrolyzed and condensed to form another sol, where the final sol is a combination of the two sols. Advantageously, the individual or combined sols can be stored for extended periods without gelation. The combined sol can ultimately be cast on a surface and permitted to cure at low temperatures into the desired gel. The two sols that are combined can differ in the proportions of precursors and water. The inorganic precursors, which hydrolyze readily and condense at a slower rate, are combined with a greater than stoichiometric amount of water to form a water rich sol. The sol containing the products from inorganic precursors that rapidly condense after hydrolysis, such as titanium dioxide precursors, are combined with a stoichiometric deficiency of water. Furthermore, the organic functional group containing precursor that less readily condenses into a gel because of the relative kinetic and/or functionality limitations to gelation is often combined with the deficiency of water before the inclusion of the rapidly hydrolyzing and condensing precursor to promote cross-condensation between the inorganic and organic functional group containing precursors and to achieve a sol with unhydrolyzed groups attached to the condensed aggregates.

In one embodiment of the invention, titanium tetraalkoxides are hydrolyzed and condensed with γ-glycidoxypropoxytrialkoxysilanes and silicon tetraalkoxides. For example, GPTMS can be mixed with a less than a stoichiometric amount of water with nitric acid present in catalytic proportions to give a partially hydrolyzed mixture. This partially hydrolyzed mixture can be generated by agitation at room temperature for short periods of time, for example about 1 hour. To this partially hydrolyzed mixture, a portion of titanium tetrabutoxide (TBT) can be included to form a partially condensed epoxysilicate-titanate sol. In parallel to the preparation of this epoxysilicate-titanate sol, an epoxysilicate sol can be prepared by mixing GPTMS with a large proportion of water, much greater than stoichiometric, with nitric acid present in catalytic proportions to give a fully hydrolyzed mixture. This hydrolyzed mixture can be agitated with tetraethoxysilane (TEOS) at room temperature for about 3 hours to produce a transparent aqueous epoxysilicate sol. The epoxysilicate-titanate sol and epoxysilicate sol can be combined with vigorous agitation to form a combined epoxysilicate-titanate sol, which rapidly becomes transparent.

The sols formed according to embodiments of the invention can be used to coat a wide variety of substrates. The substrates can be any solid material that can be heated to temperatures of about 100° C. or more without decomposition or deformation. In particular, organic materials can be used. In one embodiment, the substrate is a transparent thermoplastic, for example, polycarbonate (PC), polyethylenterephthalate (PET), polyethylenenaphthalate (PEN), or polymethylmethacrylate (PMMA). The gelation of the coating can be promoted at any temperature up to about 150° C. or higher when the thermal transitions of the substrate permit. In some embodiments of the invention, gelation can be promoted by a catalyst at a temperature below 100° C., for example, using a photochemically generated acid. In one embodiment of the invention, reaction of the organic functional group on a silane can occur photochemically when an appropriate catalyst or initiator is included, while the condensation of the hydrolyzed metal alkoxides occurs exclusively thermally. For example, if an olefin substituent is included on a silane incorporated in the reaction mixture, the vinyl addition reaction may be carried out photochemically with inclusion of an appropriate photoinitiator, such as a radical photoinitiator, while the condensation of the metal alkoxide groups, such as alkoxysilane and alkoxytitanate groups undergo a thermally induced hydrolysis and condensation.

Methods and Materials

Preparation of a 60:30:10 Mole Ration GPTMS:TBT:TEOS Combined Sol

An epoxysilicate sol was prepared by mixing 3.0 g of GPTMS in 0.5 g of water containing nitric acid in a catalytic quantity ($H_2O$:GPTMS=2.2). The mixture was stirred at room temperature for one hour. To this partially hydrolyzed GPTMS sol was added 4.3 g of TBT and the mixture stirred for three hours at room temperature to yield a stable epoxysilicate-titanate sol. In a separate container, 3.0 g of GPTMS and 10 g of water containing nitric acid in a catalytic quantity ($H_2O$:GPTMS=44) were mixed to form a sol to which 0.9 g of TEOS was added. The resulting transparent epoxysilicate-silicate sol was stirred for 3 hours at room temperature. The two sols, epoxysilicate-titanate and epoxysilicate-silicate, were mixed to form an opaque suspension that upon vigorous stirring was transformed into a transparent combined sol in approximately two minutes.

Determination of Composition Parameters for the Preparation of Clear Sols

Using a method adapted from that above with the exception of the proportions of GPTMS in the epoxysilicate-titanate sol and the combined sol, the proportions of the various precursors that can form sufficiently stable epoxysilicate-titanate (A) and epoxysilicate-silicate (B) sols was determined. In one series of experiments, tabulated in Table 1 below, the amount of TEOS provided to the final combined sol from the epoxysilicate-silicate sol (B) was held constant and the composition of the epoxysilicate-titanate sol (A) was held constant. In this manner, the proportion of the epoxysilicate varied for a fixed proportion of titanate to silicate precursors. The amount of water from the epoxysilicate-silicate (B) and epoxysilicate-titanate (A) sols was constant. As can be seen in Table 1, as the proportion of GPTMS in the mixture decreases in the epoxysilicate-silicate sol (B) and the combined sol, the combined sol is insufficiently stable for reliably preparing coatings as premature gelation can occur when the amount of GPTMS present in the epoxysilicate-silicate sol (B) dropped below ⅓ that of the GPTMS present in the epoxysilicate-titanate sol (A).

TABLE 1

Stability of combined sols for various compositions where a fixed titanate-silicate sol (A) was combined with epoxysilicate-silicate sols (B) with various proportions of epoxysilicate to silicate precursors.

| Epoxysilicate-titanate sol (A) Weight in g | | | Epoxysilicate-silicate sol (B) Weight in g | | | GPTMS/ TBT/TEOS | Combine sol |
| --- | --- | --- | --- | --- | --- | --- | --- |
| GPTMS | TBT | $H_2O$ | GPTMS | TEOS | $H_2O$ | Molar ratio | Appearance with time |
| 3.0 | 4.3 | 0.5 | 3.0 | 0.9 | 10 | 60/30/10 | Transparent - 2 min. |
| 3.0 | 4.3 | 0.5 | 1.5 | 0.9 | 10 | 53/35/12 | Transparent - 10 min. |
| 3.0 | 4.3 | 0.5 | 1.0 | 0.9 | 10 | 50/37/13 | Transparent - 3 hrs |
| 3.0 | 4.3 | 0.5 | 0.5 | 0.9 | 10 | 47/40/14 | Translucent sol |
| 3.0 | 4.3 | 0.5 | 0.0 | 0.9 | 10 | 43/43/15 | Gelled after mixing |

In another series of experiments, tabulated in Table 2 below, the amount of TBT provided to the final combined sol from the epoxysilicate-titanate sol (A) was held constant and the composition of the epoxysilicate-silicate sol (B) was held constant. In this manner, the proportion of the epoxysilicate varied for a fixed proportion of titanate and silicate precursor. The amount of water from the epoxysilicate-silicate (B) and epoxysilicate-titanate (A) sols was constant. As can be seen in Table 2, as the proportion of GPTMS in the mixture decreases in the epoxysilicate-titanate sol (A) and the combined sol, the combined sol is insufficiently stable for reliably preparing coatings as premature gelation can occur when the molar ratio of GPTMS to TBT in the epoxysilicate-titanate sol (A) dropped below ⅔ that of the epoxysilicate-silicate sol (B).

TABLE 2

Stability of combined sols where a fixed epoxysilicate-silicate sols (B) ratio was combined with an epoxysilicate-titanate sol (A) with various proportions of epoxysilicate to titanate precursors.

| Epoxysilicate-titanate sol Weight in g | | | Epoxysilicate-silicate sol Weight in g | | | GPTMS/ TBT/TEOS | Combine sol |
| --- | --- | --- | --- | --- | --- | --- | --- |
| GPTMS | TBT | $H_2O$ | GPTMS | TEOS | $H_2O$ | Molar ratio | Appearance with time |
| 3.0 | 4.3 | 0.5 | 3.0 | 0.9 | 10 | 60/30/10 | Transparent - 2 min. |
| 2.5 | 4.3 | 0.5 | 3.0 | 0.9 | 10 | 58/31/11 | Transparent - 10 min. |
| 2.0 | 4.3 | 0.5 | 3.0 | 0.9 | 10 | 56/33/11 | Partial Gelled then degelled |
| 1.5 | 4.3 | 0.5 | 3.0 | 0.9 | 10 | 50/37/13 | Gelled after mixing |
| 1.0 | 4.3 | 0.5 | 3.0 | 0.9 | 10 | 47/40/14 | Gelled after mixing |
| 0.5 | 4.3 | 0.5 | 3.0 | 0.9 | 10 | 43/43/15 | Gelled after mixing |

Figure 1:
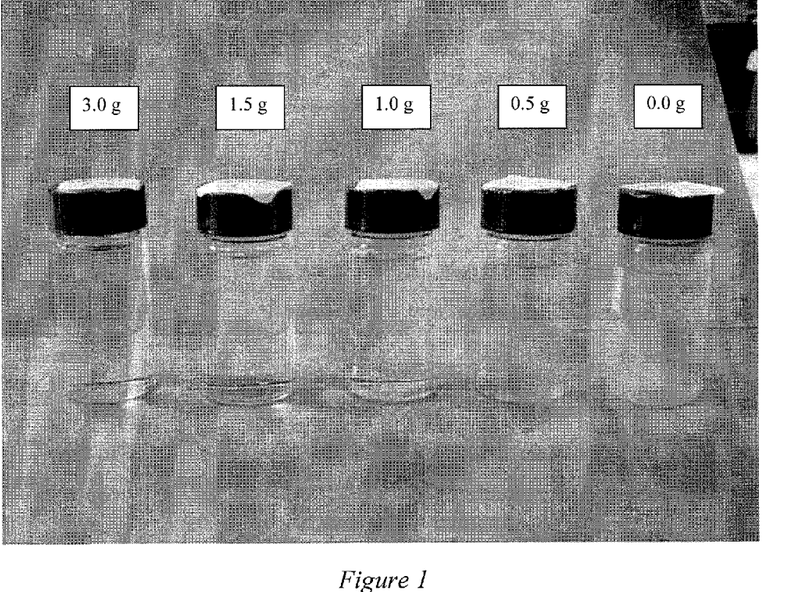
FIG. 1 shows a photographic reproduction of vials containing combined sols compositions where a fixed titanate-silicate sol was combined with epoxysilicate-silicate sols with various proportions of epoxysilicate to silicate precursors as indicated in Table 1 according to an embodiment of the invention.
Figure 2:
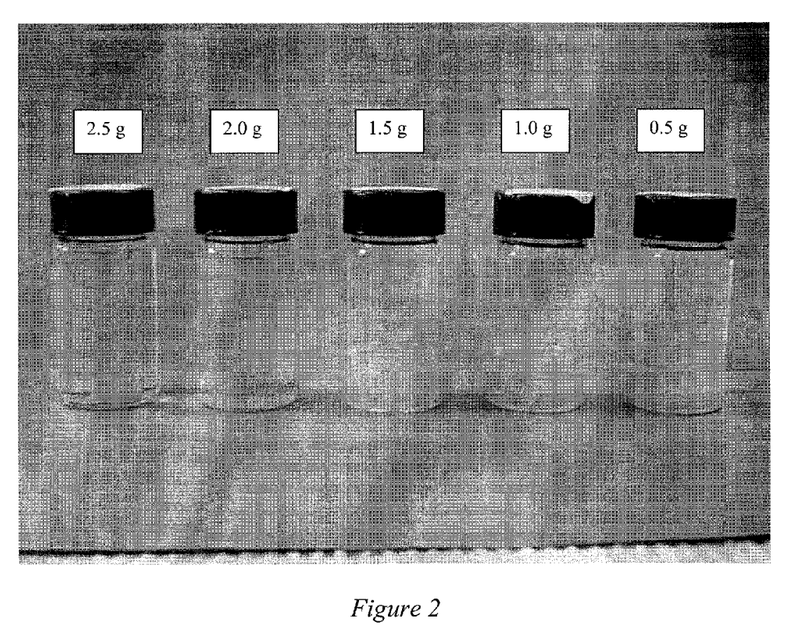
FIG. 2 shows a photographic reproduction of vials containing combined sols compositions where a fixed epoxysilicate-silicate sols (B) ratio was combined with an epoxysilicate-titanate sol (A) with various proportions of epoxysilicate to titanate precursors, as indicated in Table 2, according to an embodiment of the invention.

The compositions indicated in Table 1 produced homogeneous mixtures where even gelled mixtures appeared nearly homogeneous, as can be seen in FIG. 1 where photographic reproduction of vials containing these mixtures is shown. In contrast, the gelled compositions in Table 2 displayed phase separation as well as gelation, as can be seen in the photographic reproduction of FIG. 2.

In another series of experiments, tabulated in Table 3, below, the amount of GPTMS, TBT, TEOS, and water provided to the final combined sol was held constant but the amount of the GPTMS in the epoxysilicate-titanate sol and the epoxysilicate-silicate sol was varied and the sols were combined in relative quantities that give a constant proportion of all precursors in the combined sol. As can be seen in Table 3, having a low proportion of GPTMS in either the epoxysilicate-titanate sol (A) or epoxysilicate-silicate sol (B) resulted in an unstable sol. This study indicated that the epoxysilicate-titanate sol (A) can have a GPTMS to TBT ration of 0.5 to 2 and that the GPTMS can be distributed between the epoxysilicate-titanate (A) and epoxysilicate-silicate (B) sols at a ratio of 0.5 to 11.

Figure 3:
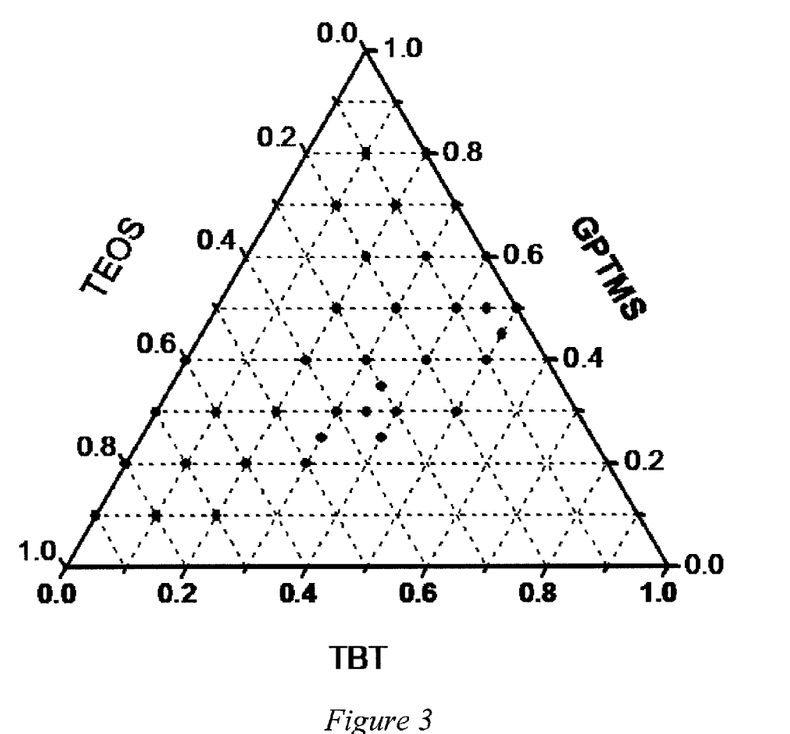
FIG. 3 is a plot of compositions of γ-glycidoxypropyltriethoxysilane (GPTMS), titanium tetrabutoxide (TBT), and tetraethoxysilane (TEOS) that result in transparent combined sols that do not display gelation within three hours of mixing to form a combined sol according to embodiments of the invention.

FIG. 3 shows a plot of the proportions of the GPTMS, TBT, and TEOS in the combined sols that result in transparent sols and that do not gel within three hours of mixing. However, the manner in which the GPTMS is proportioned between the epoxysilicate-silicate sols and titanate-silicate sols can preclude the formation of a stable sol even though the proportions of GPTMS, TBT and TEOS can be within the range where stable sols can be formed.

Figure 4:
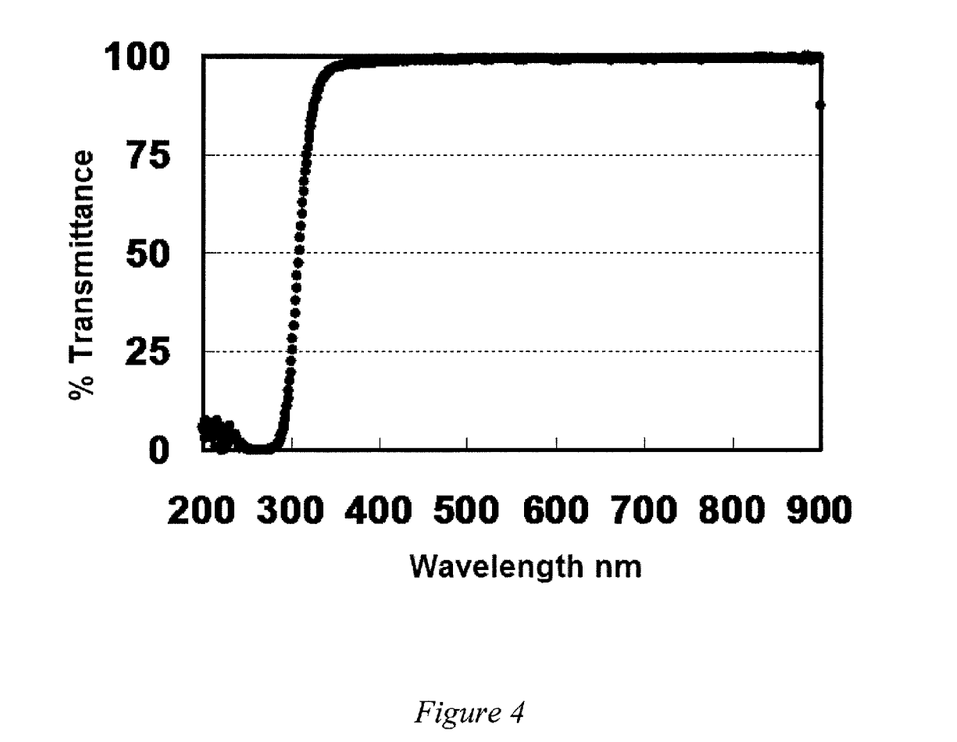
FIG. 4 is a plot of percent transmittance verses wavelength for two films from 60 GPTMS:30 TBT:10 TEOS film of about 3.6 μm according to an embodiment of the invention formed by dip coating a glass slide in a combined sol.

Optical properties of the films can be excellent for coatings according to embodiments of the invention. FIG. 4 shows a plot of percent transmittance verses wavelength for the two 3.6 μm films from 60 GPTMS:30 TBT:10 TEOS film formed by dip coating a glass slide in the combined sol. The thickness was measured using a Digimatic indicator produced by Mitsutoyo. The transmittance was measured using a Perkin-Elmer Lambda 800 UV\VIS Spectrophotometer against an uncoated glass slide reference. As can be seen from FIG. 4, the film is virtually transparent in the visible range.

Figure 5:
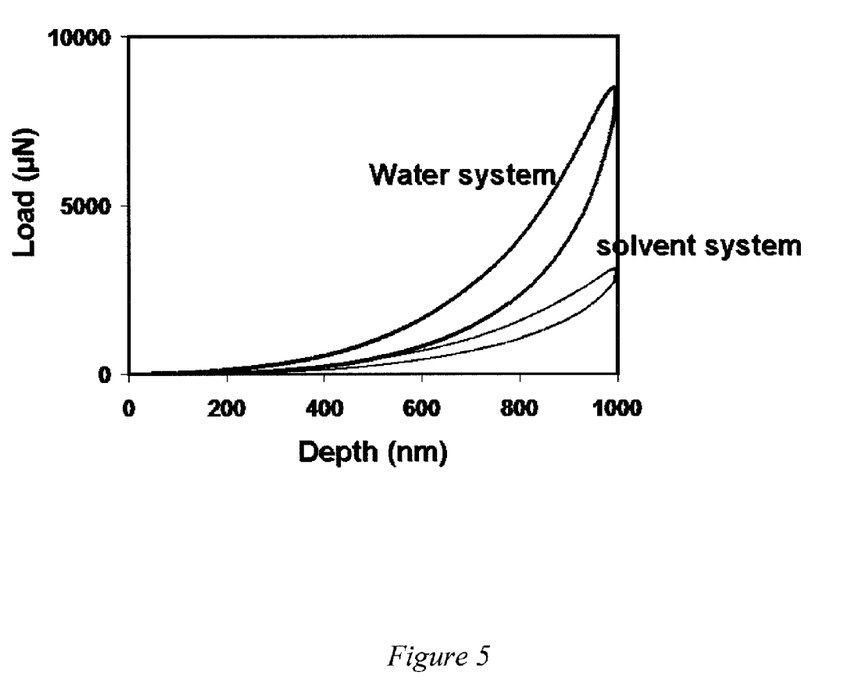
FIG. 5 is a plot of nanoindention measurements for an 80 GPTMS:10 TBTL:10 TEOS film prepared from an aqueous system according to an embodiment of the invention and an equivalent film prepared from an organic solvent.

Films were prepared on a glass substrate from a combined sol of the composition 80 GPTMS:10 TBT:10 TEOS, in a manner similar to that described above and are compared to films prepared from the same proportion of sol precursors but prepared in an organic solvent system. Nanoindention measurements were taken with a Hysitron TriboIndenter™. As can be seen in FIG. 5, the film prepared from the aqueous system required at least twice the load for indentation to an equivalent depth, demonstrating an improved hardness and toughness. The comparative stiffness and toughness are given in Table 4, below.

TABLE 3

Stability of combined sols from various compositions of epoxysilicate-silicate sols (B) and titanate-silicate sols (A) to give a constant composition combined sol.

| Epoxysilicate-titanate sol (A) Weight in g | | | Epoxysilicate-silicate sol (B) Weight in g | | | GPTMS titanate/ GPTMS silicate | Combine sol |
| --- | --- | --- | --- | --- | --- | --- | --- |
| GPTMS | TBT | $H_2O$ | GPTMS | TEOS | $H_2O$ | Molar ratio | Appearance with time |
| 6.0 | 4.3 | 0.5 | 0.0 | 0.9 | 10 | ∞ | Transparent - 2 min. |
| 5.5 | 4.3 | 0.5 | 0.5 | 0.9 | 10 | 11 | Transparent - hrs. |
| 5.0 | 4.3 | 0.5 | 1.0 | 0.9 | 10 | 5 | Transparent - hrs. |
| 4.0 | 4.3 | 0.5 | 2.0 | 0.9 | 10 | 2 | Transparent - 10 min. |
| 3.0 | 4.3 | 0.5 | 3.0 | 0.9 | 10 | 1 | Transparent - 2 min. |
| 2.0 | 4.3 | 0.5 | 4.0 | 0.9 | 10 | 0.5 | Transparent - 5 min. |
| 1.5 | 4.3 | 0.5 | 4.5 | 0.9 | 10 | 0.33 | Translucent sol |
| 1.0 | 4.3 | 0.5 | 5.0 | 0.9 | 10 | 0.2 | Gelled after mixing |

TABLE 4

Mechanical properties as measured by nanoindentation for an 80 GPTMS: 10 TBT 10 TEOS film prepared using an aqueous solution and an organic solvent solution.

|  | Aqueous System | Organic Solvent System |
|---|---|---|
| Stiffness (μN/nm) | 30 | 9 |
| Modulus (GPa) | 7.0 | 2.2 |

The inorganic-organic hybrid material can also include particulates. Composites were made where the 80 GPTMS:10 TBT:10 TEOS included 40 to 80 percent by weight boehmite particles in the form of platelets. The suspension of boehmite in the combined sol was deposited on flat glass or PET surfaces. In all cases, no cracking was observed for compositions that lead to the hybrid material with up to 60 weight percent boehmite. When composites had 65 weight percent boehmite, cracking was observed in the coating on PET, while cracking did not occur until 75 weight percent boehmite was included in the coating formed on glass. The 80 GPTMS:10 TBT:10 TEOS is not an optimized composition for the sole to form the matrix glass of the boehmite composite. Other sol compositions or different curing and devolatilization conditions can result in an optimized matrix glass with higher flexibility to permit even higher loadings of particles, for example 75 or even 80 weight percent particles in the composite.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A sol for the preparation of an inorganic-organic hybrid coating comprising:
   a combined sol comprising:
      a first sol comprising a partially condensed mixture of a hydrolyzable silane containing at least one polymerizable organic group and a hydrolyzable metal oxide precursor and less than a stoichiometric amount of water; and
      a second sol comprising at least one hydrolyzable silane, wherein one of the at least one hydrolyzable silanes is the hydrolyzable silane containing at least one polymerizable organic group and a greater than stoichiometric amount of water, wherein said combined sol is free of organic solvents in excess of those formed upon hydrolysis in the first sol and the second sol.

2. The sol of claim 1, wherein the hydrolyzable silanes have the structure $R_{(4-n)}SiX_n$ where:
   n is 1 to 4;
   X is independently a hydrolyzable group selected from $C_1$ to $C_6$ alkoxy, Cl, Br, I, hydrogen, $C_1$ to $C_6$ acyloxy, and NR'R'' where R' and R'' are independently H or $C_1$ to $C_6$ alkyl, C(O)R''', where R''' is independently H, or $C_1$ to $C_6$ alkyl; and
   R is independently a $C_1$ to $C_{12}$ radical, optionally with one or more heteroatoms, including O, S, NH, and NR'''' where R'''' is $C_1$ to $C_6$ alkyl or aryl, wherein said radical is non-hydrolyzable from the silane, and where the hydrolyzable silane is a hydrolyzable silane containing at least one polymerizable organic group, and R contains a group, selected from the group consisting of Cl, Br, I, unsubstituted or monosubstituted amino, amido, carboxyl, mercapto, isocyanato, hydroxyl, alkoxy, alkoxycarbonyl, acyloxy, phosphorous acid, acryloxy, metacryloxy, epoxy, vinyl, alkenyl, or alkynyl.

3. The sol of claim 1, wherein the second sol comprises tetraethoxysilane (TEOS) as one of the at least one hydrolyzable silane and the first sol and the second sol comprise γ-glycidoxypropyltrimethoxysilane (GPTMS) as the hydrolyzable silane containing at least one polymerizable organic group.

4. The sol of claim 1, wherein the second sol comprises γ-glycidoxypropyltrimethoxysilane (GPTMS) as the at least one hydrolyzable silane.

5. The sol of claim 1, wherein the metal oxide precursor has the structure $MX_n$ where:
   n is 2 to 4;
   M is a metal selected from the group consisting of Ti, Zr, Al, B, Sn, and V; and
   X is a hydrolyzable moiety selected from the group $C_1$ to $C_6$ alkoxy, Cl, Br, I, hydrogen, and $C_1$ to $C_6$ acyloxy.

6. The sol of claim 1, wherein the metal oxide precursor is titanium tetrabutoxide (TTB).

7. The sol of claim 1, further comprising dispersed nanoparticles, wherein said nanoparticles comprise oxides, oxide hydrates, nitrides, or carbides of Si, Al, B, Ti, or Zr in the shape of spheres, needles, or platelets.

8. The sol of claim 7, wherein the nanoparticles comprise $SiO_2$, $TiO_2$, $ZrO_2$, $Al_2O_3$, $Al(O)OH$, $Si_3N_4$ or mixtures thereof.

9. The sol of claim 7, wherein said nanoparticles are from 2 to 50 nm in cross section.

10. The sol of claim 7, wherein said nanoparticles are from 5 to 20 nm in cross section.

11. The sol of claim 7, wherein said nanoparticles comprise boehmite rods, platelets, or a combination of rods and platelets.

* * * * *